(12) United States Patent
Haka et al.

(10) Patent No.: US 7,165,567 B2
(45) Date of Patent: Jan. 23, 2007

(54) VALVE APPARATUS FOR COMPENSATING CENTRIFUGAL FORCES

(75) Inventors: Raymond J. Haka, Brighton, MI (US); Paul D. Stevenson, Ann Arbor, MI (US)

(73) Assignee: General Motors Corporation, Detroit, MI (US)

(*) Notice: Subject to any disclaimer, the term of this patent is extended or adjusted under 35 U.S.C. 154(b) by 281 days.

(21) Appl. No.: 10/871,760

(22) Filed: Jun. 17, 2004

(65) Prior Publication Data
US 2005/0279407 A1    Dec. 22, 2005

(51) Int. Cl.
*G05D 13/10* (2006.01)

(52) U.S. Cl. .................. 137/39; 137/56; 192/103 FA
(58) Field of Classification Search .............. 137/56, 137/58, 57, 39, 67; 192/103 FA
See application file for complete search history.

(56) References Cited

U.S. PATENT DOCUMENTS

| | | | | |
|---|---|---|---|---|
| 3,352,395 A | * | 11/1967 | Hilpert | 192/103 FA |
| 3,358,796 A | * | 12/1967 | Hilpert | 192/3.33 |
| 3,556,271 A | * | 1/1971 | Hilpert | 192/3.33 |
| 3,680,398 A | * | 8/1972 | Schneider | 74/733.1 |
| 4,308,940 A | * | 1/1982 | Cadee | 192/103 FA |

* cited by examiner

*Primary Examiner*—Stephen M. Hepperle
(74) *Attorney, Agent, or Firm*—Dan L. Thompson

(57) ABSTRACT

A control valve apparatus for a rotating clutch includes a valve having a spool portion and a mass portion. The spool portion provides a control function to distribute pressure from a static source to a chamber of the clutch. The valve also has a mass associated therewith which is responsive to rotation of the clutch and valve apparatus such that the apply pressure and the centrifugal effective pressure operating on the valve and the mass centrifugal force is compensated for to maintain the pressure at a specific radius of the clutch equal to the static apply pressure of the pressure source independent of rotation speed.

6 Claims, 2 Drawing Sheets

VALVE APPARATUS FOR COMPENSATING CENTRIFUGAL FORCES

TECHNICAL FIELD

This invention relates to clutch control valves and, more particularly, to clutch control valves for rotating clutch pistons.

BACKGROUND OF THE INVENTION

Power transmissions incorporating planetary gear arrangements utilize fluid-operated torque-transmitting mechanisms, such as clutches and brakes. In a majority of the transmissions, the clutch mechanisms include a rotating clutch apply piston, which is subjected to centrifugal forces from the oil within the apply chamber. The oil supplied to the clutch piston is generally controlled by a regulator valve which limits the apply pressure to the clutch. In some instances, the clutch regulator valve has a governor pressure or speed sensitive pressure applied thereto in an attempt to compensate for some of the centrifugal pressure development within the clutch apply chamber. As the clutch rotates more rapidly, the apply pressure increases within the apply chamber, thereby increasing the apply force to the clutch, which is often not desirable.

SUMMARY OF THE INVENTION

It is an object of the present invention to reduce the centrifugal pressure development within a rotating clutch mechanism.

In one aspect of the present invention, a valve mechanism which controls the apply pressure has a centrifugal balance imposed thereon.

In another aspect of the present invention, the valve mechanism has a mechanical portion, which is subjected to centrifugal forces and with a hydraulic bias chamber, which compensates for the centrifugal force applied thereto.

In yet another aspect of the present invention, the valve mechanism has a centrifugal weight portion and a valve control portion.

In still another aspect of the present invention, the centrifugal weight portion has a center of gravity on the same side of the rotatable axis as the control portion of the valve mechanism. In a further aspect of the present invention, the center of gravity of the valve mechanism is on the opposite side of the rotating axis from the control valve portion.

DESCRIPTION OF THE EXEMPLARY EMBODIMENTS

Figure 1:
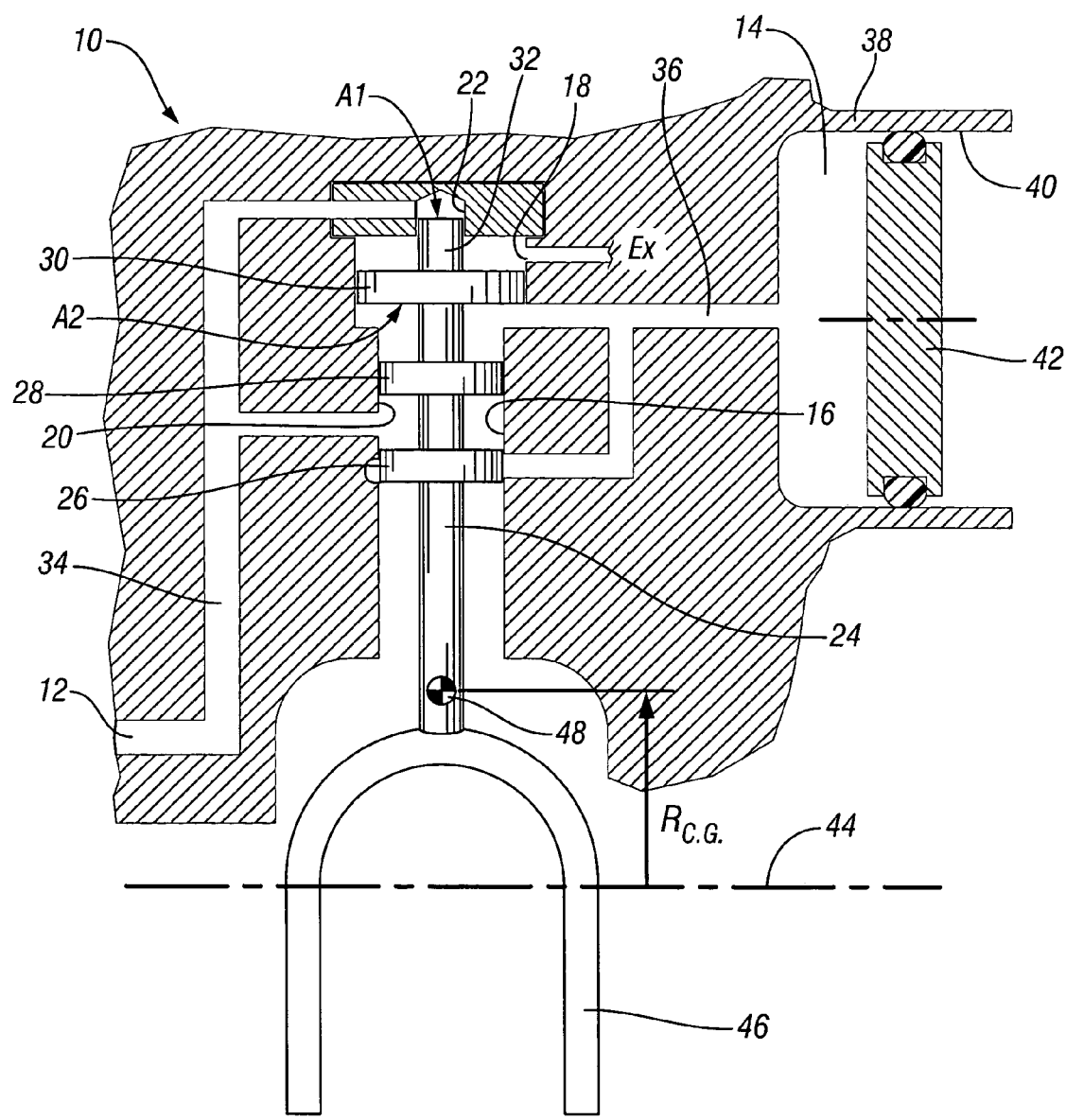
FIG. 1 is a diagrammatic representation of a control valve apparatus incorporating the present invention wherein the center of gravity of the valve apparatus is on the same side of the rotating axis as the control portion of the valve.

FIG. 1 describes a valve apparatus 10 which receives fluid pressure from a clutch apply passage 12 for delivery to a clutch apply chamber 14. The valve apparatus 10 includes a valve bore 16 having a large diameter portion 18, an intermediate diameter portion 20, and a small diameter portion 22.

A control valve or spool valve portion 24 is slidably disposed within the valve bore 16 and includes two valve lands 26 and 28 disposed in the intermediate diameter portion 20, a large diameter land 30 disposed in the large diameter portion 18, and a small diameter end portion 32 disposed in the small diameter portion 22.

The apply passage 12 communicates with a rotatable apply passage 34, which is communicated to the valve bore 16 intermediate the lands 26 and 28 and at the end of land 32. The valve bore 16 also communicates with a clutch apply passage 36 at a position between valve lands 28 and 30 and adjacent the valve land 26. The clutch apply passage 36 communicates with the apply chamber 14. The apply chamber 14 is formed in a rotatable housing 38, which has an annular bore 40 in which is slidably disposed a clutch apply piston 42. The apply piston 42 is operable to engage a plurality of friction discs in a well-known manner.

The valve apparatus 10 and chamber 14 are rotatable about an axis 44 and rotates with clutch housing 38. The valve spool 24 has a mass extension 46, which is positioned on the opposite side of the axis of rotation 44 from the valve lands 26, 28, 30, and 32. The mass of the valve spool 24 has a center of gravity 48, which is on the same side of the axis of rotation 44 as the control land portion of the valve spool 24.

When the clutch apply piston 42 is to be engaged, the pressure is supplied to the apply passage 12. The pressure therein is distributed to the passage 34 to the valve spool 24. The pressure at the valve end 32 initially opens the valve to admit pressure between the valve lands 26 and 28 to the passage 36 and therefore the chamber 14. Since both the valve apparatus 10 and the chamber 14 are rotating, a centrifugal force is generated within the passage 34 and the chamber 14.

The fluid pressure in the chamber 14 is communicated to a differential area A2 formed between the valve lands 28 and 30. This differential area A2 is equal in area to an area A1 of the end 32. As the valve 10 and the chamber 14 rotate, the force on the valve spool 24 acting through the center of gravity 48 urges the valve spool 24 outward such that the pressure in the chamber 14 is subject to exhaust between the valve land 26 and the bore 16. Since the pressure in the passage 34 also increases due to centrifugal force, this increased pressure times the area of valve land 32 is equal to compensate for the centrifugal force at the center of gravity 48. Thus, the valve 10 is controlled to permit the pressure in the chamber 14 to increase. However, the pressure in the chamber 14 is presented to the differential area between lands 28 and 30. This pressure is a combination of the apply pressure or static pressure in passage 12 plus the centrifugal pressure in chamber 14.

The valve 10 has two forces exerting an outward influence on the valve and one force exerting an inward influence on the valve. The forces acting to push the valve outward are the mass of the valve and the pressure acting in the differential area A2 between lands 28 and 30. The force tending to push the valve or urge the valve inward is the apply pressure operating at the end of land 32 which has both static pressure and centrifugal pressure applied thereto. Since areas A1 and A2 are equal, the clutch pressure will equal the static pressure plus the difference in the two centrifugal effects. Both the centrifugal effects are equal, and therefore the pressure in clutch chamber 14 at the same radius as A2 is limited to only the apply pressure and not affected by rotation speed (centrifugal forces). The pressure in clutch chamber 14 at radii other than A2 will vary with the radius.

It is desirable to select the radius for area A2 to be at the radius which has the same local pressure as the total piston force divided by the piston area. This equivalent radius is a function of the piston outer radius, the piston inner radius, and the radius that the oil starts rotation, and does not change with rotation speed. If the radius for A2 is not coincident with the equivalent radius, the net piston force will be a function of rotation speed, but with a reduced rate of change in piston force as a function of rotation speed as compared to a sealed rotating clutch housing.

Figure 2:
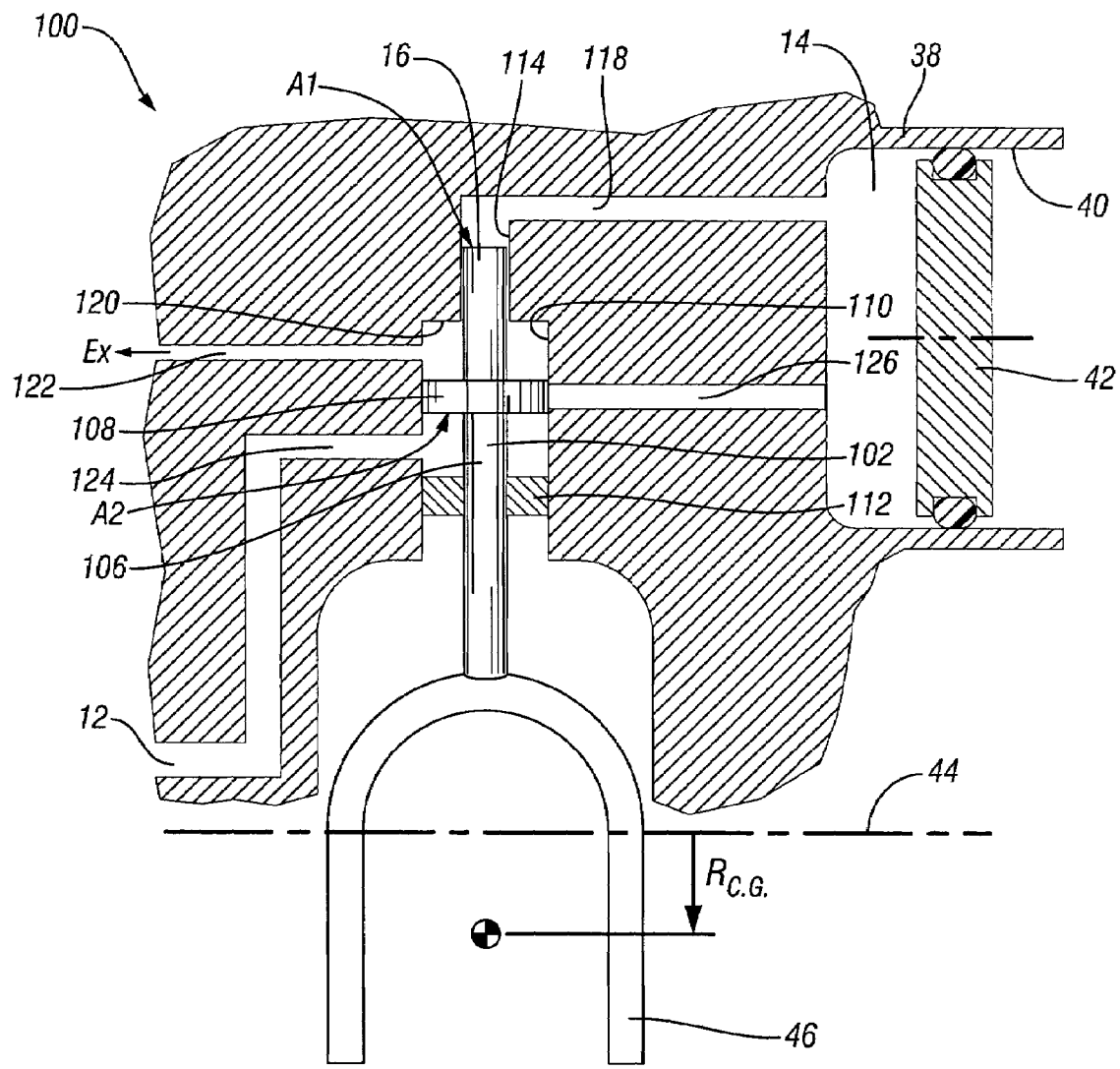
FIG. 2 is a diagrammatic representation of a control valve apparatus wherein the center of gravity of the valve apparatus is on the opposite side of the rotating axis from the control valve portion.

The valve mechanism shown in FIG. 2 includes a valve apparatus 100, which incorporates a valve spool control portion 102 and a mass portion 46. The control portion 102 of the valve 100 includes a stem 106 on which is formed a land 108. The land 108 is slidably disposed in a valve bore 110 while the stem 106 is slidably disposed in a plug 112 and a small bore 114. An area A1 at the end 116 of the stem 106 is presented through the bore 114 to a passage 118.

The area of the valve bore 110 intermediate the land 108 and a wall 120 is connected with an exhaust port 122. The valve bore 110 intermediate the land 108 and the plug 112 is in communication with an apply passage 124. The valve bore 110 is also in fluid communication with a clutch feed passage 126 which communicates with the apply chamber 14. The apply chamber 14 also communicates with the passage 118 which distributes fluid to the end 116 at the stem 106.

The valve apparatus 100 has a mass, which has a center of gravity at 128, which is on the opposite side of the axis of rotation 44 from the control portion of the valve 100. Thus, the centrifugal force in the valve 100 due to the mass is in a direction to move the valve toward the axis of rotation.

The fluid pressure within the area or a chamber between the plug 112 and the land 108 presents a force which is designed to open or move the valve outward in the bore 110, thereby communicating fluid from the apply passage 124 to the passage 126 and therefore the chamber 14. The pressure in the chamber 14 is subjected to both the static apply pressure at the passage 12 as well as centrifugal forces imposed on the fluid within the chamber 14. The pressure in chamber 14 is distributed to the end 116 of the valve stem 106 and presents a force to move the valve inward toward the axis of rotation.

The area A2 presented by the differential area between the land 108 and the stem 106 is subjected to apply pressure and the inward forces are the result of clutch pressure plus centrifugal force. The areas A1 and A2 are equal. If the valve spool 102 is moved inward significantly, the fluid pressure in the clutch chamber 14 will begin to decrease due to communication with the exhaust port 122. Should this occur, the pressure acting on the differential area A2 will urge the valve spool 102 to move outward to re-supply oil to the chamber 14 while centrifugal force on the valve mass and the pressure at the area A1 urge the valve spool 102 outward. This action eliminates the centrifugal portion of the pressure within the chamber 14 in a manner similar to that described above for FIG. 1. The centrifugal forces are balanced such that the chamber 14 at the radius of A2 is subjected only to the pressure of the apply oil in passage 12. As stated earlier, it is desirable to set the radius of A2 at the equivalent radius to eliminate any change in piston apply force as a function of rotation speed.

It will be appreciated by those skilled in the art that the difference between FIGS. 1 and 2 is a simple reversal of the valve logic and the reason for choosing one over the other is a matter of oil routing. While the valve is shown as a spool type valve, other valve structures are possible within the inventive concept presented above.

The invention claimed is:

1. A control valve apparatus for controlling fluid pressure within a rotating chamber having an axis of rotation said valve comprising:
   a source of pressure for supplying an apply pressure to said rotating chamber;
   a valve member disposed within a valve bore and having a mass with a center of gravity disposed on one side of said axis of rotation, said valve member having a first area subjected to said apply pressure and a centrifugal pressure, and a second area connected with said chamber and subjected to only the pressure in said chamber; and
   said mass of said valve acting in addition to the pressure at said second area to balance said valve wherein the pressure in said chamber is equal to the apply pressure.

2. The control valve apparatus for controlling fluid pressure within a rotating chamber having an axis of rotation said valve defined in claim 1 further wherein:
   said first area is a differential area, and said second area is formed on one end of said valve member; and
   said center of gravity is on the opposite side of the axis of rotation from the first area.

3. A control valve apparatus for controlling fluid apply pressure within a rotating chamber having an axis of rotation said valve comprising:
   a source of pressure for supplying a fluid pressure to said rotating chamber, said fluid pressure having a centrifugal component and an apply component;
   a valve having two pressure sensitive areas and a mass, said valve rotating about said axis with said rotating chamber, a first of said pressure sensitive areas being subjected to said fluid pressure to urge the valve to a position for admitting said fluid pressure to said rotating chamber, a second of said pressure sensitive areas being subjected to a pressure in said rotating chamber to urge said valve to limit the pressure therein to said fluid apply pressure, and said valve having a mass imposing a centrifugal force on said valve to assist in limiting said pressure in said rotating chamber to said fluid apply pressure.

4. A control valve apparatus for controlling fluid pressure within a rotating chamber having an axis of rotation said valve comprising:
   a source of pressure for supplying an apply pressure to said rotating chamber;
   a valve member disposed within a valve bore and having a mass with a center of gravity disposed on one side of said axis of rotation, said valve member having a first area subjected to said apply pressure and a centrifugal pressure, and a second area connected with said chamber and subjected to only the pressure in said chamber, said valve member includes a valve spool and one of said first and second areas is a differential area and the other of said areas is formed at one end of said valve spool; and
   said mass of said valve acting in addition to the pressure at said second area to balance said valve wherein the pressure in said chamber is equal to the apply pressure.

5. The control valve apparatus for controlling fluid pressure within a rotating chamber having an axis of rotation said valve defined in claim 4 further wherein:

said second area is a differential area, and said first area is formed on one end of said valve member, and said center of gravity and said first area are on the same side of the axis of rotation.

6. The control valve apparatus for controlling fluid pressure within a rotating chamber having an axis of rotation said valve defined in claim 4 further wherein:

said second area is a differential area, and said first area is formed on one end of said valve member, said center of gravity and said first area are on the same side of the axis of rotation; and said second area is nearest the center of gravity.

* * * * *